(12) United States Patent
Kono et al.

(10) Patent No.: US 9,697,705 B2
(45) Date of Patent: Jul. 4, 2017

(54) TACTILE SENSATION PROVIDING APPARATUS AND CONTROL METHOD FOR TACTILE SENSATION PROVIDING APPARATUS

(75) Inventors: Kenji Kono, Kanagawa (JP); Megumi Kuwabara, Kanagawa (JP); Jun Takeda, Kanagawa (JP); Takashi Miyake, Kanagawa (JP); Takayuki Shinozaki, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 112 days.

(21) Appl. No.: 13/807,653

(22) PCT Filed: May 11, 2011

(86) PCT No.: PCT/JP2011/002621
§ 371 (c)(1),
(2), (4) Date: Dec. 28, 2012

(87) PCT Pub. No.: WO2012/001860
PCT Pub. Date: Jan. 5, 2012

(65) Prior Publication Data
US 2013/0106756 A1    May 2, 2013

(30) Foreign Application Priority Data

Jun. 30, 2010  (JP) .................. 2010-149679

(51) Int. Cl.
*G06F 3/044* (2006.01)
*G08B 6/00* (2006.01)
(Continued)

(52) U.S. Cl.
CPC ............. *G08B 6/00* (2013.01); *G06F 1/3215* (2013.01); *G06F 1/3262* (2013.01);
(Continued)

(58) Field of Classification Search
CPC ........ G06F 3/016; G06F 3/041; G06F 3/0488; G06F 3/04842; G06F 3/0412; G06F 3/0414; G06F 3/044; G06F 3/0482
See application file for complete search history.

(56) References Cited

U.S. PATENT DOCUMENTS 5,167,024 A    11/1992  Smith et al.
2002/0033795 A1   3/2002  Shahoian et al.
(Continued)

FOREIGN PATENT DOCUMENTS

CA        2685647 A1    6/2010
CN     101669791 A      3/2010
(Continued)

OTHER PUBLICATIONS

The extended European search report issued by the European Patent Office on Jun. 4, 2014, which corresponds to European Patent Application No. 11800338.3-1904.
(Continued)

*Primary Examiner* — Lixi C Simpson
(74) *Attorney, Agent, or Firm* — Studebaker & Brackett PC (57) ABSTRACT

A tactile sensation providing apparatus includes a touch sensor 11, a tactile sensation providing unit 13 configured to vibrate a touch face of the touch sensor 11, a tactile sensation provision control unit 14 configured to control drive of the tactile sensation providing unit 13, and a main control unit 17 configured to control an operation of the tactile sensation provision control unit 14 based on an output of the touch sensor 11. The main control unit 17 determines whether an object is touching a predetermined area of the touch face based on the output of the touch sensor 11, and starts the operation of the tactile sensation provision control unit 14 when determining that the object is touching the predetermined area, or stops the operation of the tactile sensation (Continued)

provision control unit 14 when determining that the object is not touching the predetermined area.

8 Claims, 7 Drawing Sheets

(51) Int. Cl.
*G06F 1/32* (2006.01)
*G06F 3/01* (2006.01)
*G06F 3/041* (2006.01)
*G09G 3/00* (2006.01)

(52) U.S. Cl.
CPC ............ *G06F 1/3265* (2013.01); *G06F 3/016* (2013.01); *G06F 3/041* (2013.01); *G06F 3/0414* (2013.01); *G06F 3/0416* (2013.01); *G09G 3/001* (2013.01); *G09G 2330/022* (2013.01); *Y02B 60/1242* (2013.01)

(56) References Cited

U.S. PATENT DOCUMENTS

| | | | |
|---|---|---|---|
| 2002/0149561 A1 | 10/2002 | Fukumoto et al. | |
| 2007/0097073 A1 | 5/2007 | Takashima et al. | |
| 2009/0251427 A1 | 10/2009 | Hung et al. | |
| 2009/0303175 A1 | 12/2009 | Koivunen | |
| 2010/0141410 A1 | 6/2010 | Aono et al. | |
| 2010/0156818 A1* | 6/2010 | Burrough et al. | 345/173 |
| 2011/0080369 A1* | 4/2011 | Chang et al. | 345/174 |
| 2011/0102326 A1* | 5/2011 | Casparian | G06F 3/016 345/168 |
| 2011/0109588 A1* | 5/2011 | Makinen et al. | 345/174 |
| 2011/0128236 A1* | 6/2011 | Faubert | 345/173 |
| 2011/0134061 A1* | 6/2011 | Lim | 345/173 |
| 2011/0141052 A1* | 6/2011 | Bernstein et al. | 345/174 |
| 2011/0248931 A1* | 10/2011 | Shenfield | G06F 3/016 345/173 |

FOREIGN PATENT DOCUMENTS

| | | |
|---|---|---|
| JP | H09-171499 A | 6/1997 |
| JP | 10-293644 A | 11/1998 |
| JP | H11-212725 A | 8/1999 |
| JP | 2001-119476 A | 4/2001 |
| JP | 2006-085286 A | 3/2006 |
| JP | 2006-107140 A | 4/2006 |
| JP | 2008-046844 A | 2/2008 |
| JP | 2009-252235 A | 10/2009 |
| JP | 2010-140102 A | 6/2010 |
| KR | 20100002720 A | 1/2010 |
| KR | 20100030030 A | 3/2010 |

OTHER PUBLICATIONS

International Search Report; PCT/JP2011/002621; Aug. 9, 2011; with translation.
An Office Action; "Notice of Reason for Rejection," issued by the Japanese Patent Office on Feb. 12, 2014, which corresponds to Japanese Patent Application No. 2010-149679; with English language concise explanation.
An Office Action; "Notice of Reasons for Rejection," issued by the Japanese Patent Office on May 20, 2014, which corresponds to Japanese Patent Application No. 2010-149679; with English language concise explanation.
An Office Action issued by the Korean Patent Office on Feb. 24, 2014, which corresponds to Korean Patent Application No. 2013-7002499; with English language concise explanation.
An Office Action issued by the Taiwanese Patent Office on Feb. 24, 2014, which corresponds to Taiwanese Patent Application No. 100120189; with English language concise explanation.
Notification of the Third Office Action issued by the State Intellectual Property Office of China on May 12, 2016, which corresponds to Chinese Patent Application No. 201180032866.5; with English language translation.
Communication pursuant to Article 94(3) EPC issued by the European Patent Office on Apr. 4, 2016, which corresponds to European Patent Application No. 11800338.3-1904.

* cited by examiner

TACTILE SENSATION PROVIDING APPARATUS AND CONTROL METHOD FOR TACTILE SENSATION PROVIDING APPARATUS

CROSS REFERENCE TO RELATED APPLICATION

This application claims priority to and the benefit of Japanese Patent Application No. 2010-149679 filed on Jun. 30, 2010, the entire contents of which are incorporated herein by reference.

TECHNICAL FIELD

The present invention relates to a tactile sensation providing apparatus having a touch sensor and a control method for the tactile sensation providing apparatus.

BACKGROUND ART

In recent years, input apparatuses having touch sensors such as touch panels, touch switches or the like are popularly used as input apparatuses such as operation units for receiving input operations by operators in mobile devices such as mobile phones and gaming machines, information equipments such as calculator and ticket vending machines, home electric appliances such as microwaves, TV sets and lighting equipments, industrial equipments (FA equipments) and the like.

There are known a variety of types of the touch sensors, such as a resistive film type, a capacitive type, an optical type and the like. However, the touch sensors of these types receive a touch input (input operation) by a pressing means (object) such as a finger or a stylus pen and, unlike push-button switches, the touch sensors themselves are not physically displaced when being touched.

As such, there is suggested an input apparatus that, for example, vibrates the touch sensor when the input apparatus detects an input applying a predetermined pressing load or greater to a predetermined area of the touch sensor, such that a tactile sensation is provided at operator's fingertip as feedback (for example, see Patent Document 1).

RELATED ART DOCUMENT

Patent Document

Patent Document 1: Japanese Patent Laid-Open No. 10-293644

SUMMARY OF INVENTION

Technical Problem

However, the input apparatus disclosed in the Patent Document 1 set forth above, regardless of whether there is the input operation to the touch sensor, continuously detects a pressing load on the touch sensor. That is, when there is no input operation to the touch sensor, or when the input operation is performed to a position out of the predetermined area, the pressing load on the touch sensor is detected. Accordingly, power consumption increases and thus there is a concern that especially a battery of the mobile device is acceleratedly consumed.

Accordingly, an object of the present invention in consideration of the above problem is to provide a tactile sensation providing apparatus appropriately configured to be able to reduce power consumption and a control method for the tactile sensation providing apparatus.

Solution to Problem

In order to achieve the above object, a tactile sensation providing apparatus according to a first aspect of the present invention includes:

a touch sensor;

a tactile sensation providing unit configured to vibrate a touch face of the touch sensor;

a tactile sensation provision control unit configured to control drive of the tactile sensation providing unit; and a main control unit configured to control an operation of the tactile sensation provision control unit based on an output of the touch sensor, wherein the main control unit determines whether an object is touching a predetermined area of the touch face based on the output of the touch sensor, and starts the operation of the tactile sensation provision control unit when determining that the object is touching the predetermined area, or stops the operation of the tactile sensation provision control unit when determining that the object is not touching the predetermined area.

A second aspect of the present invention is the tactile sensation providing apparatus according to the first aspect, further including a load detection unit configured to detect a pressing load on the touch sensor, wherein the tactile sensation provision control unit, upon starting the operation, controls drive of the tactile sensation providing unit based on an output of the load detection unit.

A third aspect of the present invention is the tactile sensation providing apparatus according to the first or the second aspect, further including a display unit configured to display a touch input panel of the touch sensor.

Further, in order to achieve the above object, a control method for a tactile sensation providing apparatus according to a fourth aspect of the present invention including a touch sensor;

a tactile sensation providing unit configured to vibrate a touch face of the touch sensor; and a tactile sensation provision control unit configured to control drive of the tactile sensation providing unit, includes a step of:

determining whether an object is touching a predetermined area of the touch face based on an output of the touch sensor, and starting an operation of the tactile sensation provision control unit when determining that the object is touching the predetermined area, or stopping the operation of the tactile sensation provision control unit when determining that the object is not touching the predetermined area.

Effect of the Invention

According to the present invention, since the operation of the tactile sensation provision control unit is stopped when the object is not touching the predetermined area of the touch sensor, power consumption may be reduced.

DESCRIPTION OF EMBODIMENTS

Embodiments of the present invention will be described with reference to the accompanying drawings.

Figure 1:
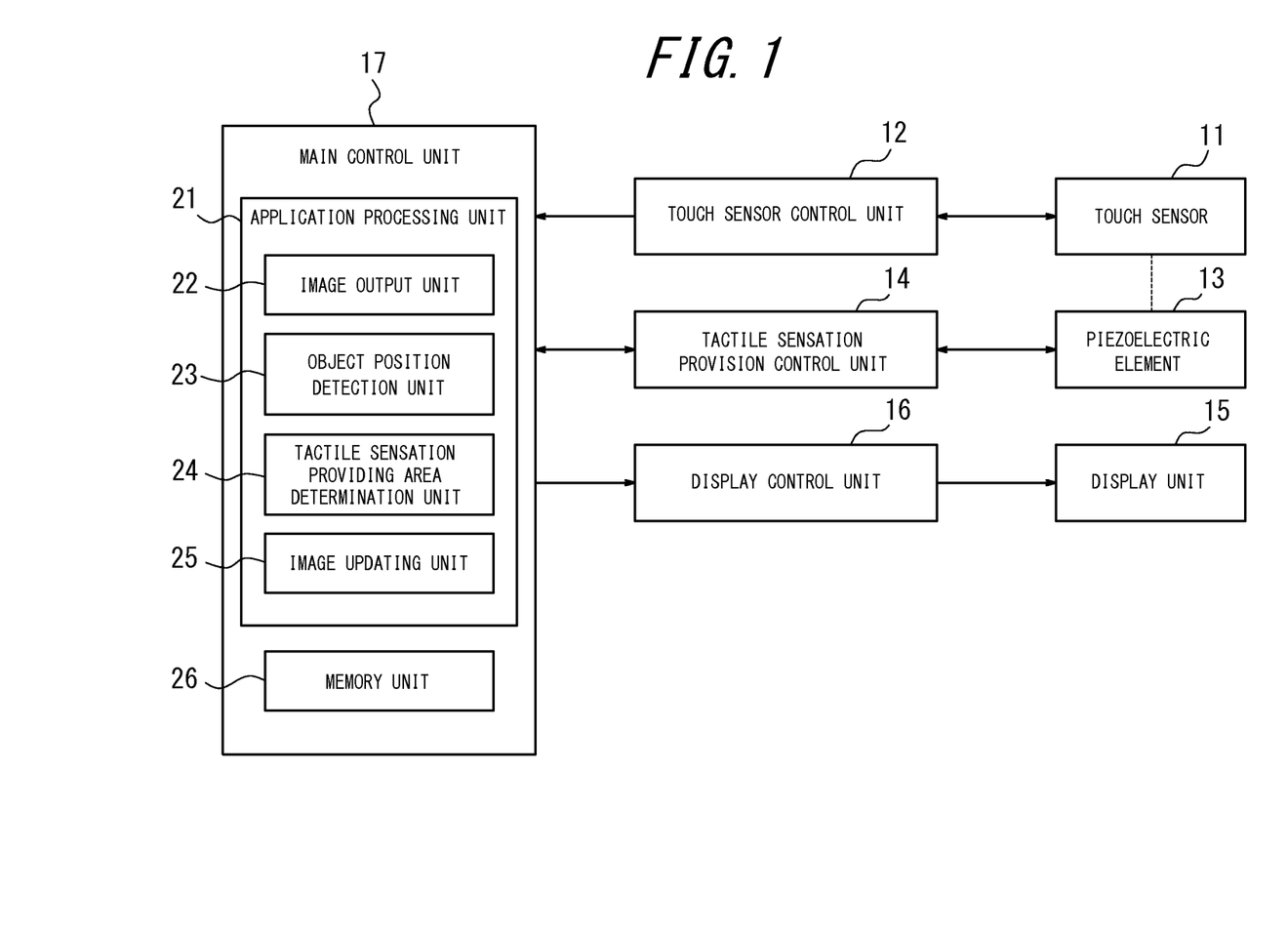
FIG. 1 is a functional block diagram illustrating a schematic configuration of a tactile sensation providing apparatus according to one embodiment of the present invention.
Figure 2:
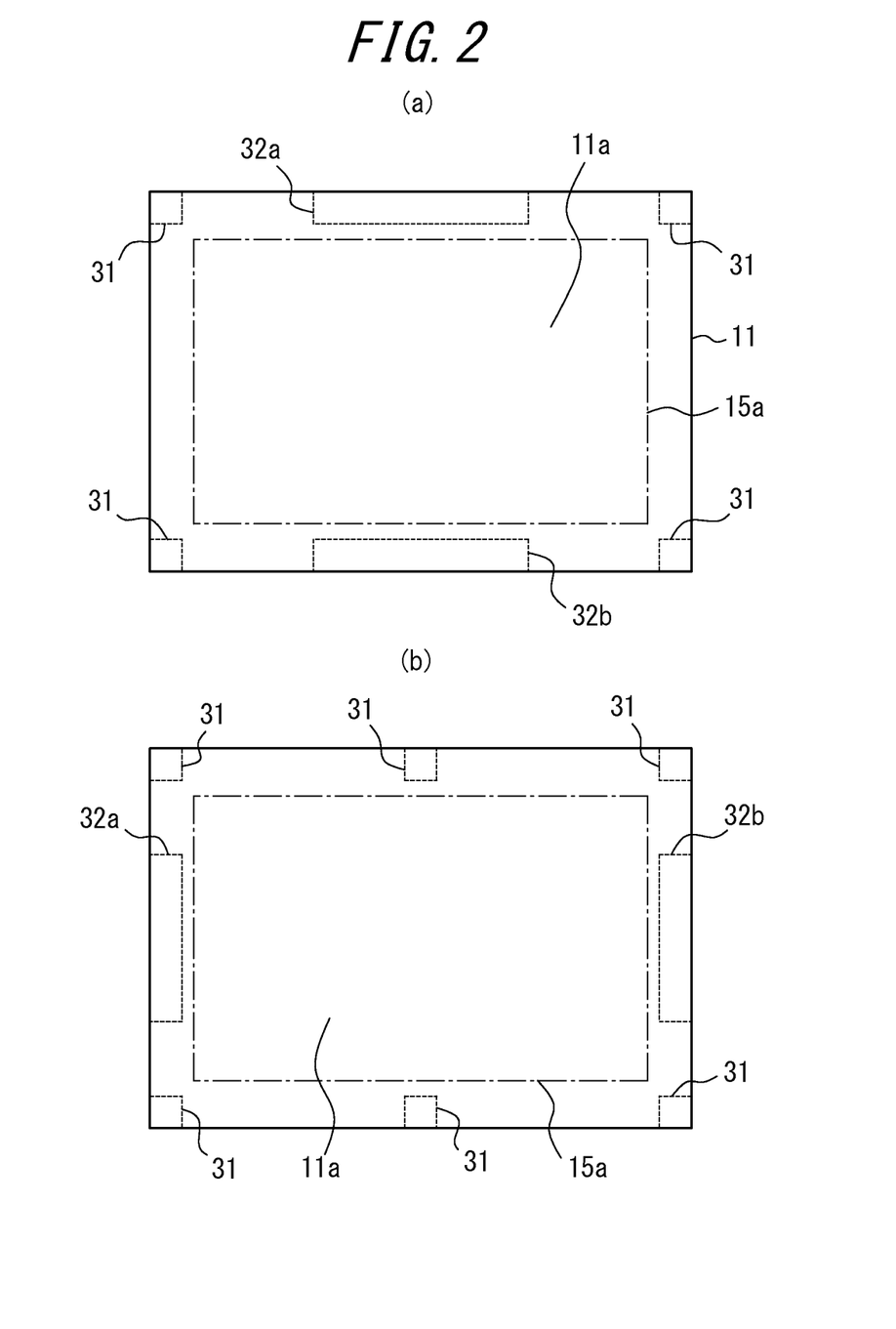
FIG. 2(a) and FIG. 2(b) are plane views illustrating two examples of a schematic configuration of a supporting structure of a touch sensor illustrated in FIG. 1.

FIG. 1 is a functional block diagram illustrating a schematic configuration of a tactile sensation providing apparatus according to one embodiment of the present invention. The tactile sensation providing apparatus includes a touch sensor 11, a touch sensor control unit 12, a piezoelectric element 13, a tactile sensation provision control unit 14, a display unit 15, a display control unit 16 and a main control unit 17. The touch sensor 11 receives a touch input to the display unit 15 by a pressing means (pressing object) such as a finger and the like and is configured by using, for example, a touch panel, a touch switch or the like of a known type such as a resistive film type, a capacitive type, an optical type and the like. Input position information of the pressing object on a touch face 11a (see FIG. 2) of the touch sensor 11 is detected by the touch sensor control unit 12 based on an output of the touch sensor 11. The detected input position information is supplied to the main control unit 17.

The piezoelectric element 13 includes a tactile sensation providing unit for vibrating the touch face 11a of the touch sensor 11 and a load detection unit for detecting a pressing load on the touch sensor 11. The pressing load detected by the piezoelectric element 13 is supplied to the tactile sensation provision control unit 14. The tactile sensation provision control unit 14, based on the pressing load detected by the piezoelectric element 13, controls drive of the piezoelectric element 13.

The tactile sensation provision control unit 14 is configured by using a dedicated processor (for example, DSP (Digital Signal Processor)) and, based on an instruction from the main control unit 17, controlled to start and stop an operation. That is, the tactile sensation provision control unit 14 is activated from a non-active state by an operation start instruction from the main control unit 17 and inactivated from an active state by an operation stop instruction from the main control unit 17. In the active state, the tactile sensation provision control unit 14, based on a parameter table (described below) transmitted together with the operation start instruction from the main control unit 17, controls detection of the pressing load by the piezoelectric element 13 and drive of the piezoelectric element 13. In the non-active state, the tactile sensation provision control unit 14 stops controlling detection of the pressing load and drive of the piezoelectric element 13. Also, the tactile sensation provision control unit 14, in the active state, drives the piezoelectric element 13 such that the touch sensor 11 is vibrated and transmits a vibration notification to the main control unit 17.

The display unit 15 is controlled by the main control unit 17 through the display control unit 16. Thereby, the display unit 15 displays a panel based on an application or OS (Operating System). Also, the display unit 15 displays a touch input panel having an input button or the like such as, for example, a push button switch (push-type button switch). The display unit 15 is configured by using, for example, a liquid crystal display panel, an organic EL display panel and the like.

The main control unit 17 is configured by using any appropriate processor such as CPU (Central Processing Unit) or the like and includes an application processing unit 21. The application processing unit 21 includes an image output unit 22, an object position detection unit 23, a tactile sensation providing area determination unit 24 and an image updating unit 25. The image output unit 22 outputs information about an image displayed on the display unit 15 via the display control unit 16. The object position detection unit 23, based on the input position information from the touch sensor control unit 12, detects a position of the object. The tactile sensation providing area determination unit 24, based on a result of detection of the position of the object by the object position detection unit 23, determines whether there is the object in a tactile sensation providing area in the image. That is, the tactile sensation providing area determination unit 24 determines whether the object has entered the tactile sensation providing area. The image updating unit 25, based on the vibration notification from the tactile sensation provision control unit 14, updates the information about the image displayed on the display unit 15. The information about the image updated by the image updating unit 25 is output from the image output unit 22 to the display control unit 16.

The main control unit 17, based on a result of determination by the tactile sensation providing area determination unit 24, transmits the operation start instruction or the operation stop instruction to the tactile sensation provision control unit 14 so as to control start or stop of the operation.

The main control unit 17 further includes a memory unit 26 for storing a plurality of parameter tables used for providing tactile sensations. The parameter table includes a variety of parameters such as the number of pressing steps, the number of releasing steps, a pressing threshold, a releasing threshold, a pressing vibration pattern, a releasing vibration pattern, vibration intensity, calibration parameters and the like.

The number of pressing steps is for setting the number of steps (times) for providing the tactile sensation (pressing sensation) to the object while the object is pressing the touch sensor 11. The number of releasing steps is for setting the number of steps (times) for providing the tactile sensation (release sensation) to the object while the object is releasing the touch sensor 11. The pressing threshold and the releasing threshold are for setting a load threshold at each of the pressing step and the releasing step, respectively. The pressing vibration pattern and the releasing vibration pattern are for setting patterns of a drive signal to be provided to the piezoelectric element 13 for providing the pressing sensation and the release sensation, respectively. Based on the pressing vibration pattern and the releasing vibration pattern, a click sensation, a pressing sensation and the like obtained when pressing the push-button switch are provided. The vibration intensity is for setting vibration intensity of each of the pressing vibration pattern and the releasing vibration pattern. The calibration parameter is for setting the vibration intensity and input sensitivity for each tactile sensation providing area.

The memory unit 26 stores the parameter table including a combination of the parameters. The main control unit 17 transmits the parameter table corresponding to the tactile sensation providing area together with the operation start instruction to the tactile sensation provision control unit 14.

Also, when the main control unit 17 does not receive the vibration notification from the tactile sensation provision control unit 14 at a point when a predetermined time has passed after transmission of the operation start instruction to the tactile sensation provision control unit 14, the main control unit 17 provides a forced drive instruction together with a predetermined parameter table to the tactile sensation provision control unit 14. The main control unit 17 and the tactile sensation provision control unit 14 communicate with each other by using known means such as UART (Universal Asynchronous Receiver Transmitter), I2C (Inter-integrated Circuit) and GPIO (General Purpose Input/Output).

FIG. 2(a) and FIG. 2(b) are plane views illustrating two examples of a schematic configuration of a supporting structure of the touch sensor 11 illustrated in FIG. 1. In the supporting structure illustrated in FIG. 2(a), the touch panel 11 is rectangular in shape in a planar view and bendably supported on the display unit 15 (see FIG. 1) via support members 31 at four corners on a rear side of the touch panel 11. On the rear side of the touch sensor 11 and outside a display area 15a of the display unit 15 indicated by dashed lines in the figure, piezoelectric elements 32a, 32b in the shape of a strip are adhered along each of two long sides at a center thereof. The piezoelectric elements 32a, 32b constitute the piezoelectric element 13 in FIG. 1.

Accordingly, when the touch face 11a is pressed, the touch sensor 11 slightly bends. When the touch sensor 11 bends, electricity is charged to the piezoelectric elements 32a, 32b and a voltage is generated. Also, when the voltage is externally applied to the piezoelectric elements 32a, 32b, the piezoelectric elements 32a, 32b bend and thus the touch sensor 11 vibrates bending while being supported by the support members 31 at four points.

In the supporting structure illustrated in FIG. 2(b), the touch panel 11 is rectangular in shape in the planar view and bendably supported on the display unit 15 (see FIG. 1) via the support members 31 at six points on the rear side of the touch panel 11: four corners and each center point of the two long sides. On the rear side of the touch sensor 11 and outside the display area 15a of the display unit 15, the piezoelectric elements 32a, 32b in the shape of a strip constitute the piezoelectric element 13 in FIG. 1 and are adhered along each of two short sides at a center thereof.

Accordingly, in a similar manner to a case in FIG. 2(a), the touch sensor 11 slightly bends when the touch face 11a is pressed. When the touch sensor 11 bends, electricity is charged to the piezoelectric elements 32a, 32b and the voltage is generated. Also, when the voltage is externally applied to the piezoelectric elements 32a, 32b, the piezoelectric elements 32a, 32b are displaced bending and thus the touch sensor 11 vibrates bending while being supported by the support members 31 at the six points.

The following is a description of examples of operations of the main control unit 17 and the tactile sensation provision control unit 14 of the tactile sensation providing apparatus illustrated in FIG. 1. In the following description, it is assumed that the display unit 15 already displays an image including a necessary tactile sensation providing area based on the application obtained from the image output unit 22 in the application processing unit 21 in the main control unit 17 via the display control unit 16.

First Operation Example

Figure 3:
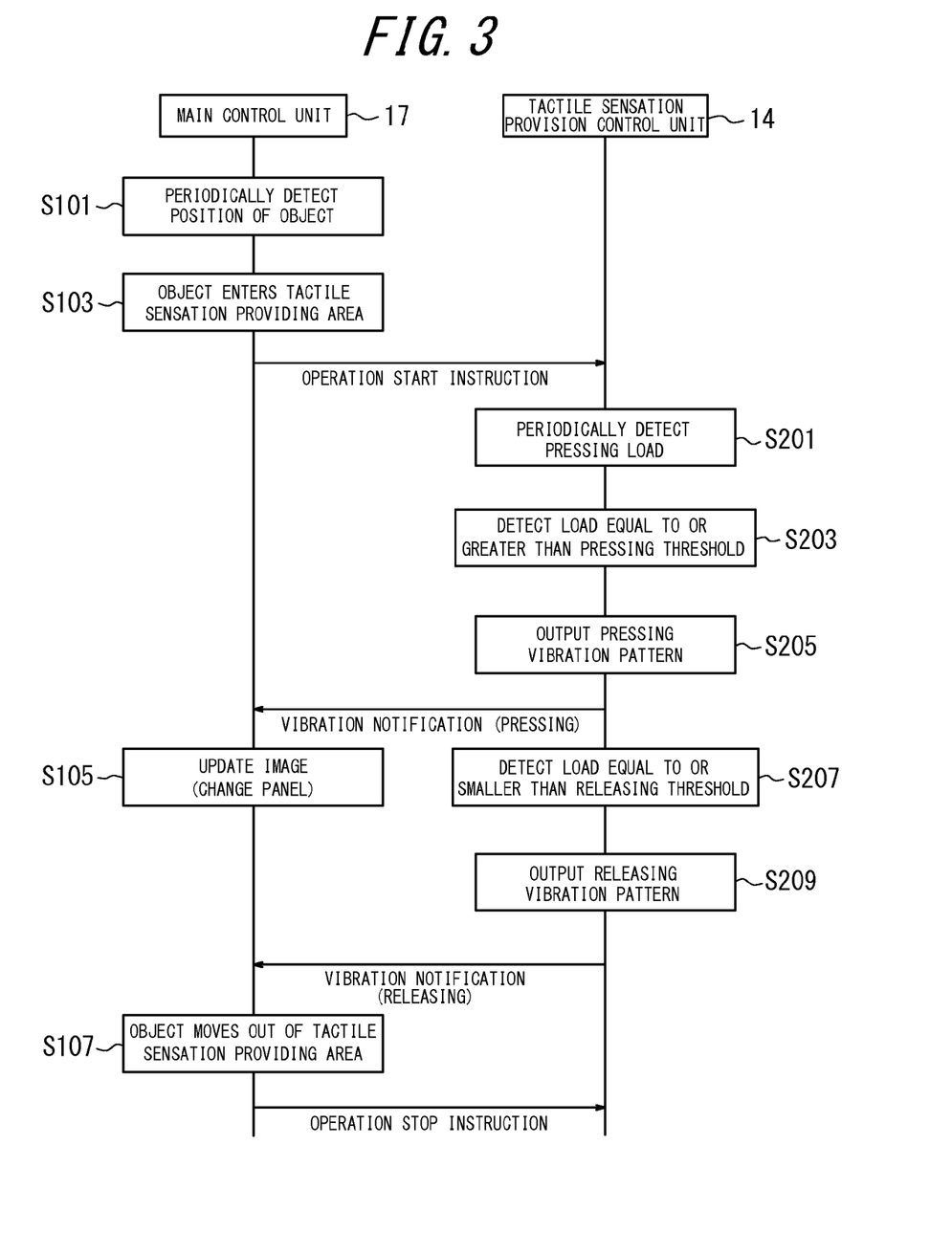
FIG. 3 is a sequence diagram illustrating a first operation example of a main control unit and a tactile sensation provision control unit of the tactile sensation providing apparatus illustrated in FIG. 1.

FIG. 3 is a sequence diagram of a first operation example. According to the first operation example, in the tactile sensation providing area, the tactile sensation is provided at one step each in pressing and in releasing. First, the main control unit 17 periodically obtains the input position information detected by the object position detection unit 23 from the touch sensor control unit 12 to detect a position of the object such as the finger or the like on the touch sensor 11 (S101). When the tactile sensation providing area determination unit 24 detects that the object has entered the tactile sensation providing area in the image on the display unit 15 based on the result of detection of the position of the object by the object position detection unit 23 (S103), the main control unit 17 transmits the operation start instruction to the tactile sensation provision control unit 14. Also, the main control unit 17 retrieves a parameter table including one step of pressing and one step of releasing corresponding to the tactile sensation providing area from the memory unit 26 and transmits the parameter table, in addition to the operation start instruction, to the tactile sensation provision control unit 14.

When having received the operation start instruction from the main control unit 17, the tactile sensation provision control unit 14 is activated from the non-active state and stores the parameter table received together with the operation start instruction in an built-in memory (not illustrated). Then, the tactile sensation provision control unit 14 periodically obtains an output voltage of the piezoelectric element 13 to detect the pressing load on the touch sensor 11 (S201). When the tactile sensation provision control unit 14 detects that the pressing load has reached the pressing threshold set in the parameter table (S203), the tactile sensation provision control unit 14 outputs the pressing vibration pattern set in the parameter table to the piezoelectric element 13 (S205). In synchronization with that, the tactile sensation provision control unit 14 transmits a pressing vibration notification to the main control unit 17.

Also, the tactile sensation provision control unit 14, after transmitting the pressing vibration notification, keeps monitoring the output voltage of the piezoelectric element 13 to detect the pressing load on the touch sensor 11. When the tactile sensation provision control unit 14 detects that the pressing load has reached the releasing threshold set in the parameter table (S207), the tactile sensation provision control unit 14 outputs the releasing vibration pattern set in the parameter table to the piezoelectric element 13 (S209). In synchronization with that, the tactile sensation provision control unit 14 transmits a releasing vibration notification to the main control unit 17.

On the other hand, when the main control unit 17 receives a first vibration notification (in this case, the pressing vibration notification) from the tactile sensation provision control unit 14 after transmitting the operation start instruction and the parameter table to the tactile sensation provision control unit 14, the image update unit 25 updates the information about the image displayed on the display unit 15 according to the application (S105). Then, when the main control unit 17 receives a next vibration notification (in this case, the release vibration notification) from the tactile sensation provision control unit 14 and, further, the tactile sensation providing area determination unit 24 detects that the object has moved out of the tactile sensation providing area (S107), the main control unit 17 transmits the operation stop instruction to the tactile sensation provision control unit 14.

When the tactile sensation provision control unit 14 receives the operation strop instruction from the main control unit 17, the tactile sensation provision control unit 14 clears the parameter table stored in the built-in memory and is inactivated from the active state to stop controlling detection of the pressing load and drive of the piezoelectric element 13.

Second Operation Example

Figure 4:
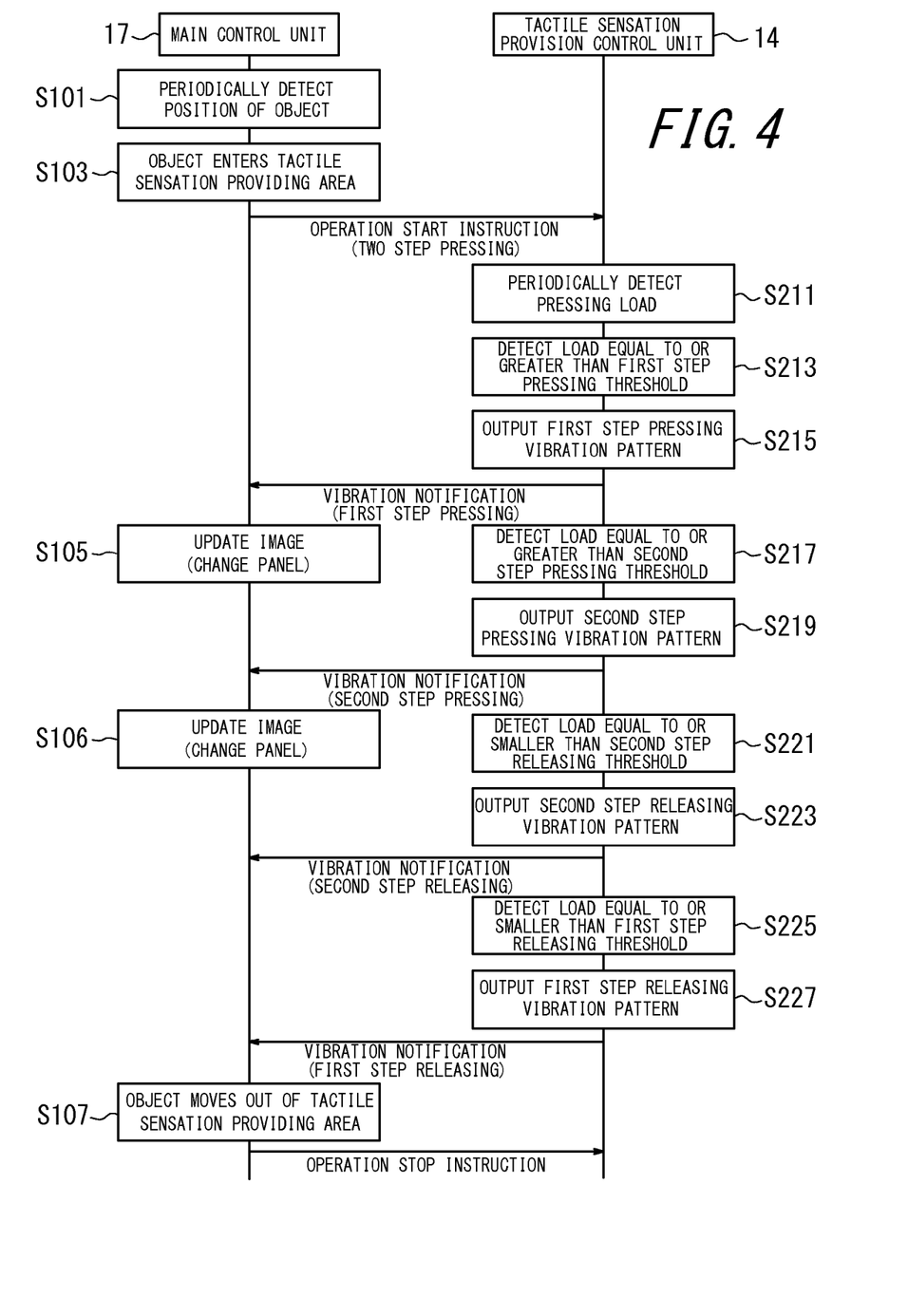
FIG. 4 is a sequence diagram illustrating a second operation example of the main control unit and the tactile sensation provision control unit of the tactile sensation providing apparatus illustrated in FIG. 1.

FIG. 4 is a sequence diagram of a second operation example. According to the second operation example, in the tactile sensation providing area, the tactile sensation is provided at two steps each in pressing and in releasing. In this case, the main control unit 17 retrieves a parameter table including two steps of pressing and two steps of releasing corresponding to a detected tactile sensation providing area, and transmits the parameter table, together with the operation start instruction, to the tactile sensation provision control unit 14. Note that the processes at S101 and S103 by the main control unit 17 in FIG. 4 are the same as those at S101 and S103 in FIG. 3.

When the tactile sensation provision control unit 14 receives the operation start instruction from the main control unit 17, the tactile sensation provision control unit 14, in a similar manner to the first operation example, is activated and stores the parameter table, received together with the operation start instruction, in the built-in memory. Then, the tactile sensation provision control unit 14, in a similar manner to the first operation example, periodically detects the pressing load on the touch sensor 11 (S211). When the tactile sensation provision control unit 14 detects that the pressing load has reached a first step pressing threshold set in the parameter table (S213), the tactile sensation provision control unit 14 outputs a pressing vibration pattern corresponding to the first step set in the parameter table to the piezoelectric element 13 (S215). In synchronization with that, the tactile sensation provision control unit 14 transmits a first step pressing vibration notification to the main control unit 17.

The tactile sensation provision control unit 14, after transmitting the first step pressing vibration notification, keeps monitoring the output voltage of the piezoelectric element 13 to detect the pressing load on the touch sensor 11. When the tactile sensation provision control unit 14 detects that the pressing load has reached a pressing threshold at a second step set in the parameter table (S217), the tactile sensation provision control unit 14 outputs a pressing vibration pattern corresponding to the second step set in the parameter table to the piezoelectric element 13 (S219). In synchronization with that, the tactile sensation provision control unit 14 transmits a second step pressing vibration notification to the main control unit 17.

The tactile sensation provision control unit 14, after transmitting the second step pressing vibration notification, keeps monitoring the output voltage of the piezoelectric element 13 to detect the pressing load on the touch sensor 11. When the tactile sensation provision control unit 14 detects that the pressing load has reached a releasing threshold at the second step set in the parameter table (S221), the tactile sensation provision control unit 14 outputs a releasing vibration pattern corresponding to the second step set in the parameter table to the piezoelectric element 13 (S223). In synchronization with that, the tactile sensation provision control unit 14 transmits a second step releasing vibration notification to the main control unit 17.

The tactile sensation provision control unit 14, after transmitting the second step pressing vibration notification, still keeps monitoring the output voltage of the piezoelectric element 13 to detect the pressing load on the touch sensor 11. When the tactile sensation provision control unit 14 detects that the pressing load has reached a releasing threshold at the first step set in the parameter table (S225), the tactile sensation provision control unit 14 outputs a releasing vibration pattern corresponding to the first step set in the parameter table to the piezoelectric element 13 (S227). In synchronization with that, the tactile sensation provision control unit 14 transmits a first step releasing vibration notification to the main control unit 17.

On the other hand, when the main control unit 17 receives the first step pressing vibration notification from the tactile sensation provision control unit 14 after transmitting the operation start instruction and the parameter table to the tactile sensation provision control unit 14, the main control unit 17, in a similar manner to the first operation example, updates the information about the image displayed on the display unit 15 according to the application (S105). Next, when the main control unit 17 receives the second step pressing vibration notification from the tactile sensation provision control unit 14, the main control unit 17, in a similar manner to that described above, updates the information about the image displayed on the display unit 15 according to the application (S106).

Then, when the main control unit 17 receives the second step releasing vibration notification and the first step releasing vibration notification and, further, the tactile sensation providing area determination unit 24 detects that the object has moved out of the tactile sensation providing area (S107), the main control unit 17 transmits the operation stop instruction to the tactile sensation provision control unit 14.

When the tactile sensation provision control unit 14 receives the operation stop instruction from the main control unit 17, the tactile sensation provision control unit 14, in a similar manner to the first operation example, clears the parameter table stored in the built-in memory and is inactivated from the active state to stop controlling detection of the pressing load and drive of the piezoelectric element 13.

Third Operation Example

Figure 5:
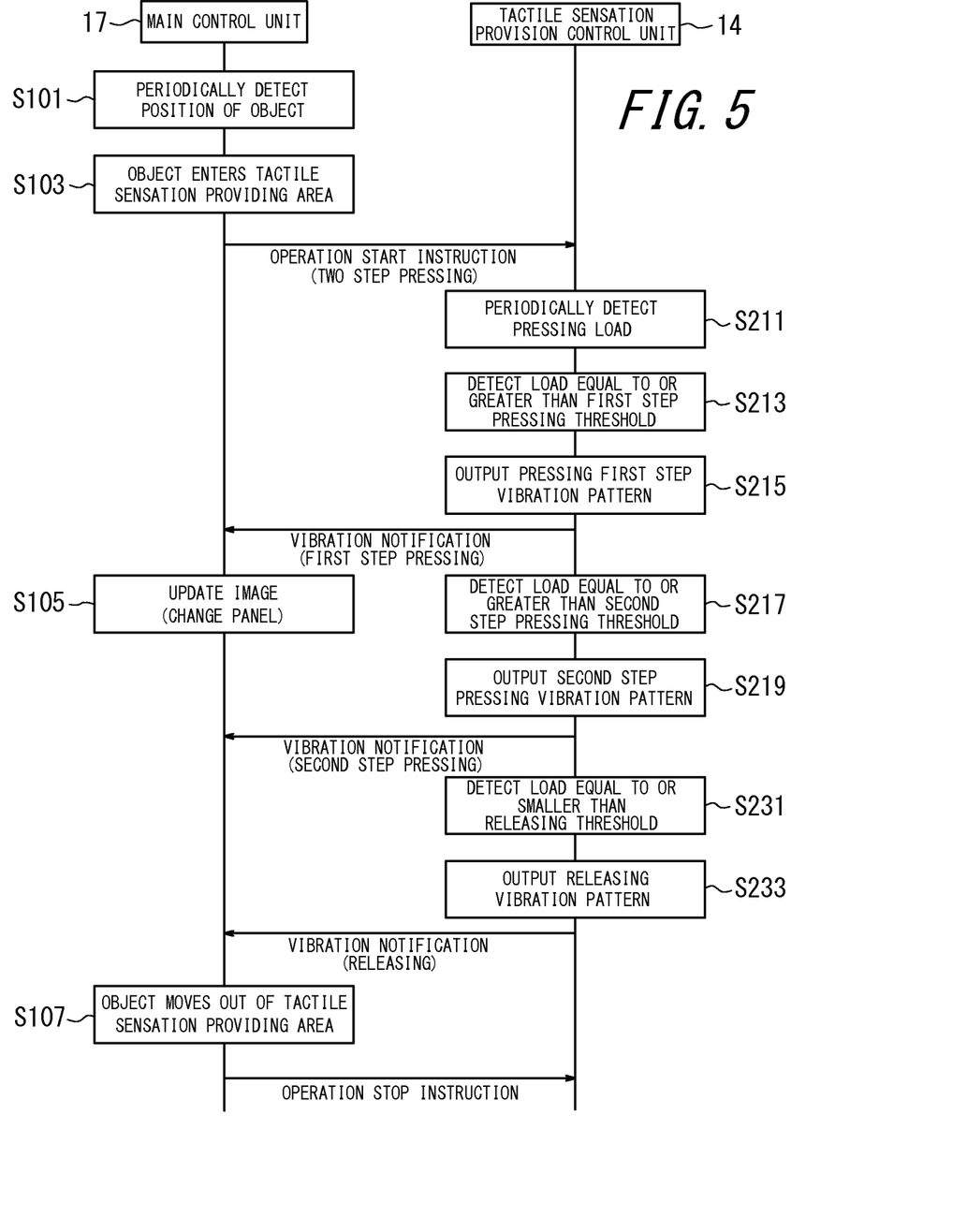
FIG. 5 is a sequence diagram illustrating a third operation example of the main control unit and the tactile sensation provision control unit of the tactile sensation providing apparatus illustrated in FIG. 1.

FIG. 5 is a sequence diagram of a third operation example. According to the third operation example, in the tactile sensation providing area, the tactile sensation is provided at two steps in pressing and one step in releasing. In this case, the main control unit 17 retrieves a parameter table including two steps of pressing and one step of releasing corresponding to the detected tactile sensation providing area and transmits the parameter table, together with the operation start instruction, to the tactile sensation provision control unit 14. Note that the processes at S101 and S103 by the main control unit 17 in FIG. 5 are the same as those at S101 and S103 in FIG. 3.

When the tactile sensation provision control unit 14 receives the operation start instruction from the main control unit 17, the tactile sensation provision control unit 14 performs processes similar to those at S211, S213 and S215 in FIG. 4 and transmits the first step pressing vibration notification to the main control unit 17. Then, the tactile sensation provision control unit 14 performs processes similar to those at S217 and S219 in FIG. 4 and transmits the second step pressing vibration notification to the main control unit 17.

Then, when the tactile sensation provision control unit 14, after transmitting the second step pressing vibration notification, detects that the pressing load has reached the release threshold set in the parameter table (S231), the tactile sensation provision control unit 14 outputs the release vibration pattern set in the parameter table to the piezoelectric element 13 (S233). In synchronization with that, the tactile sensation provision control unit 14 transmits the releasing vibration notification to the main control unit 17.

On the other hand, when the main control unit 17 receives the first step pressing vibration notification from the tactile sensation provision control unit 14 after transmitting the operation start instruction and the parameter table to the tactile sensation provision control unit 14, the main control unit 17, in a similar manner to the first operation example, updates the information about the image displayed on the display unit 15 according to the application (S105). Then, when the main control unit 17 receives the releasing vibration notification from the tactile sensation provision control unit 14 and, further, the tactile sensation providing area determination unit 24 detects that the object has moved out of the tactile sensation providing area (S107), the main control unit 17 transmits the operation stop instruction to the tactile sensation provision control unit 14.

When the tactile sensation provision control unit 14 receives the operation stop instruction from the main control unit 17, the tactile sensation provision control unit 14, in a similar manner to the first operation example, clears the parameter table stored in the built-in memory and is inactivated from the active state. Accordingly, the tactile sensation provision control unit 14 stops controlling detection of the pressing load and drive of the piezoelectric element 13.

According to the first to third operation examples described above, when the object such as the finger directly enters a predetermined area of the touch sensor 11 corresponding to the tactile sensation providing area displayed on the display unit 15, the tactile sensation provision control unit 14 is immediately activated and controls to provide the tactile sensation. That is, when a position of the object touching the touch sensor 11 corresponds to the tactile sensation providing area, the tactile sensation provision control unit 14 is immediately activated and controls to provide the tactile sensation. Then, when the object is released directly from the tactile sensation providing area without sliding, that is, when the object position detection unit 23 stops detecting the position of the object, the tactile sensation provision control unit 14 is immediately inactivated.

Figure 6:
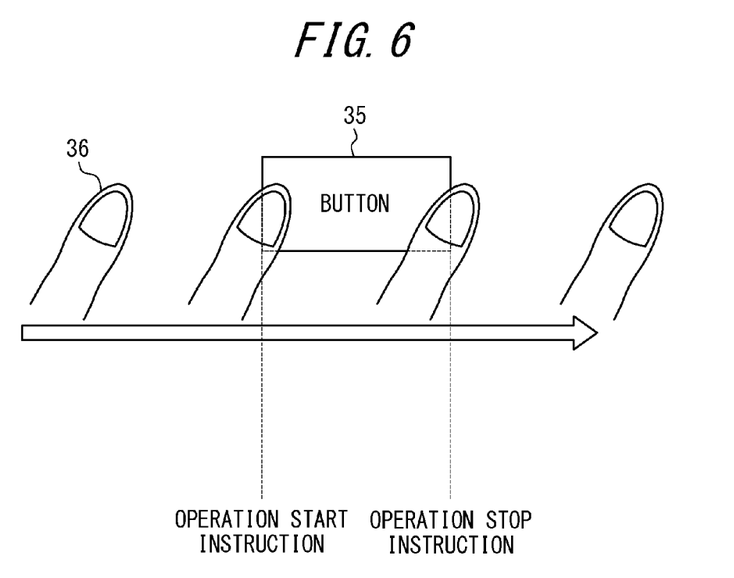
FIG. 6 is a diagram illustrating an example of an operation of an object to the touch panel.

As illustrated in FIG. 6, when an object 36 slides as indicated by an arrow across the tactile sensation providing area 35 such as a graphically depicted button or the like on the touch sensor 11, it is detected that a position of the object 36 has entered the tactile sensation providing area 35. Then, the main control unit 17 transmits the operation start instruction to the tactile sensation provision control unit 14, and thus the tactile sensation provision control unit 14 is activated. Also, when it is detected that the position of the object 36 has moved out of the tactile sensation providing area 35, the main control unit 17 transmits the operation stop instruction to the tactile sensation provision control unit 14, and thus the tactile sensation provision control unit 14 is inactivated. In this case, accordingly, when a load satisfying the pressing threshold is detected while the object 36 is positioned in the tactile sensation providing area 35, the tactile sensation is provided. On the other hand, when a load satisfying the pressing threshold is not detected, the tactile sensation is not provided and, at a point when the object passes the tactile sensation providing area, the tactile sensation provision control unit 14 is inactivated.

According to the first to third operation examples, as described above, while the object is positioned in the predetermined area of the touch sensor 11 corresponding to the tactile sensation providing area, the tactile sensation provision control unit 14 is activated and controls the piezoelectric element 13 to provide the tactile sensation and, otherwise, the tactile sensation provision control unit 14 is inactivated and stops controlling the piezoelectric element 13 to provide the tactile sensation. Accordingly, unnecessary power consumption may be prevented and thus power consumption may be reduced.

Fourth Operation Example

Figure 7:
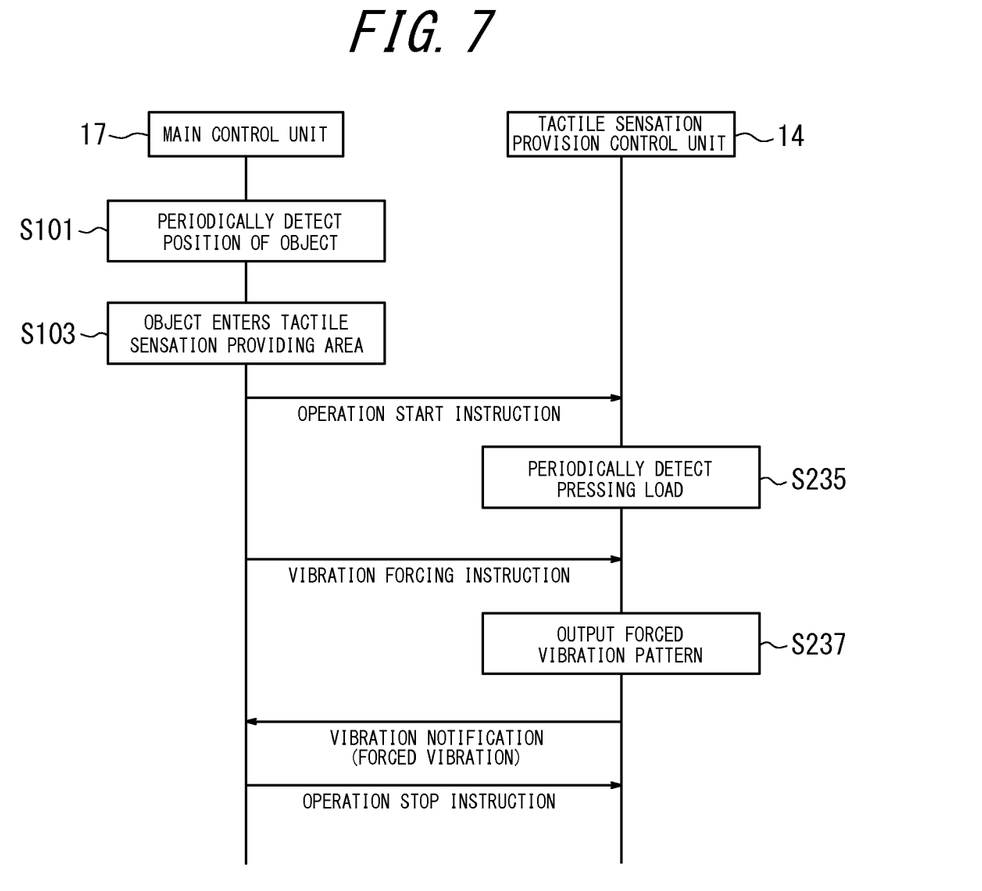
FIG. 7 is a sequence diagram illustrating a fourth operation example of the main control unit and the tactile sensation provision control unit of the tactile sensation providing apparatus illustrated in FIG. 1.

FIG. 7 is a sequence diagram of a fourth operation example. According to the fourth operation example, when the main control unit 17 does not obtain the vibration notification from the tactile sensation provision control unit 14 after the predetermined time since the main control unit 17 has transmitted the operation start instruction to the tactile sensation provision control unit 14, the piezoelectric element 13 is forcibly vibrated such that the tactile sensation is provided. In FIG. 7, when the main control unit 17 detects a position of the object in the tactile sensation providing area through processes at S101 and S103 of the first to third operation examples described above, the main control unit 17 retrieves the parameter table corresponding to the tactile sensation providing area from the memory unit 26 and transmits the parameter table to the tactile sensation provision control unit 14.

When the tactile sensation provision control unit 14 receives the operation start instruction from the main control unit 17, the tactile sensation provision control unit 14, in a similar manner to the operation examples described above, periodically obtains the output voltage of the piezoelectric element 13 to detect the pressing load on the touch sensor 11 (S235).

On the other hand, the main control unit 17, after transmitting the operation start instruction and the parameter table to the tactile sensation provision control unit 14, monitors the vibration notification from the tactile sensation provision control unit 14. As a result, when the vibration notification is not received in a predetermined time (for example, 60 seconds) after transmission of the operation start instruction, the main control unit 17 transmits a vibration forcing instruction to the tactile sensation provision control unit 14 and a parameter table for forced vibration. The parameter table for the forced vibration includes parameters such as a forced vibration pattern, vibration intensity, calibration parameter for the tactile sensation providing area, and the like.

When the tactile sensation provision control unit 14 receives the vibration forcing instruction and the parameter table for the forced vibration from the main control unit 17, the tactile sensation provision control unit 14 updates the built-in memory with the parameter table for the forced vibration. Then, the tactile sensation provision control unit 14 outputs the forced vibration pattern to the piezoelectric element 13 based on the parameter table for the forced vibration such that the piezoelectric element 13 is forcibly vibrated (S237). In synchronization with that, the tactile sensation provision control unit 14 transmits the vibration notification to the main control unit 17.

Then, when the main control unit 17 receives the vibration notification from the tactile sensation provision control unit 14, the main control unit 17, even when the object is positioned in the tactile sensation providing area, transmits the operation stop instruction to the tactile sensation provision control unit 14. Thereby, the operation state of the tactile sensation provision control unit 14 is inactivated from the active state to stop controlling detection of the pressing load and drive of the piezoelectric element 13.

According to the fourth operation example, as described above, when the tactile sensation provision control unit 14 controls the tactile sensation providing unit (the piezoelectric element 13) to vibrate the touch face 11a, the tactile sensation provision control unit 14 transmits the vibration notification to the main control unit 17. When the main control unit 17 does not receive the vibration notification from the tactile sensation provision control unit 14 in the predetermined time since the main control unit 17 has started an operation of the tactile sensation provision control unit 14, the main control unit 17 transmits the vibration forcing instruction to the tactile sensation provision control unit 14. Then, the main control unit 17, after receiving the vibration notification from the tactile sensation provision control unit 14, stops the operation of the tactile sensation provision control unit 14.

According to the fourth operation example described above, when the object lightly touches the predetermined area of the touch sensor 11 corresponding to the tactile sensation providing area but the pressing load is maintained at a value unsatisfying the pressing threshold, the tactile sensation is provided to the object at a point when the predetermined time has passed since the object has touched the predetermined area. Thereby, the operator may realize that the object has been touching the tactile sensation providing area for the predetermined time. Also, when the piezoelectric element is used to detect the pressing load and the pressing load gradually increases, electric charge is not accumulated in the piezoelectric element in proportion to the load (displacement). Therefore, it is assumed that the tactile sensation is not provided when the pressing load exceeding the pressing threshold is actually applied and thus the operator may have a sense of concern. In such a case, when the touch sensor 11 is forcibly vibrated such that the tactile sensation is provided, the operator may be moved to carry out re-operation, thereby improving convenience. Further, since the tactile sensation provision control unit 14 is inactivated after the forced vibration, power consumption may be reduced.

According to the first to fourth operation examples described above, when the main control unit 17, after activating the tactile sensation provision control unit 14, detects that the object has moved out of the tactile sensation providing area, regardless of whether the vibration notification has been received, the main control unit 17, at that point, transmits the operation stop instruction to the tactile sensation provision control unit 14 to inactivate the tactile sensation provision control unit 14.

It is to be understood that the present invention is not limited to the above embodiments but may be modified or varied in a multiple of manners. For example, a plurality of parameter tables for providing the tactile sensation stored in the memory unit 26 in the main control unit 17 may be stored in the tactile sensation provision control unit 14 as well. Then, the main control unit 17 specifies a number of the parameter table to be used such that the tactile sensation provision control unit 14 uses the specified parameter table.

Also, although the piezoelectric element 13 constitutes the tactile sensation providing unit and the load detection unit, the tactile sensation providing unit and the load detection unit may be provided separately. In such a case, the tactile sensation providing unit may be configured by using, not limited to the piezoelectric element, but other known vibration means such as an eccentric motor, solenoid and the like. Also, the touch sensor may be supported via laminated piezoelectric elements. Similarly, the load detection unit may be configured by using, not limited to the piezoelectric element, but other known load detection means such as a strain gauge sensor and the like. Moreover, the load detection unit may be omitted. Further, the present invention is also applicable to a tactile sensation providing apparatus including no display unit but including a touch sensor having the tactile sensation providing area directly depicted thereon by printing or the like.

REFERENCE SIGNS LIST 11 touch sensor
11a touch face
12 touch sensor control unit
13 piezoelectric element
14 tactile sensation provision control unit
15 display unit
16 display control unit
17 main control unit
21 application processing unit
22 image output unit
23 object position detection unit
24 tactile sensation providing area determination unit
25 image updating unit
26 memory unit
32a, 32b piezoelectric element
35 tactile sensation providing area
36 object

The invention claimed is:

1. A tactile sensation providing apparatus comprising:
   a touch sensor;
   a tactile sensation providing unit configured to vibrate a touch face of the touch sensor;
   a tactile sensation provision controller configured to control drive of the tactile sensation providing unit; and
   a main controller configured to control an operation of the tactile sensation provision controller based on an output of the touch sensor, wherein
   the main controller determines whether an object is touching a predetermined area of the touch face based on the output of the touch sensor, and activates the tactile sensation provision controller from a non-active state when determining that the object is touching the predetermined area, or inactivates the tactile sensation provision controller from an active state when determining that the object is not touching the predetermined area,
   in the non-active state, the tactile sensation provision controller stops controlling detection of a pressing load and drive of a piezoelectric element, and
   in the active state, the tactile sensation provision controller drives the piezoelectric element and transmits a vibration notification to the main control unit.

2. The tactile sensation providing apparatus according to claim 1, further comprising a load detection unit configured to detect a pressing load on the touch sensor, wherein the tactile sensation provision controller, upon starting the operation, controls drive of the tactile sensation providing unit based on an output of the load detection unit.

3. The tactile sensation providing apparatus according to claim 1, further comprising a display unit configured to display a touch input panel of the touch sensor.

4. A control method for a tactile sensation providing apparatus including
a touch sensor;
a tactile sensation providing unit configured to vibrate a touch face of the touch sensor; and
a tactile sensation provision controller configured to control drive of the tactile sensation providing unit, the control method comprising steps of:
determining whether an object is touching a predetermined area of the touch face based on an output of the touch sensor, and activating the tactile sensation provision controller from a non-active state when determining that the object is touching the predetermined area, or inactivating the tactile sensation provision controller from an active state when determining that the object is not touching the predetermined area,
in the non-active state, stopping control detection of a pressing load and drive of a piezoelectric element, and
in the active state, driving the piezoelectric element and transmitting a vibration notification to a main control unit.

5. A tactile sensation providing apparatus comprising:
a touch sensor;
a tactile sensation providing unit configured to vibrate a touch face of the touch sensor;
a tactile sensation provision controller configured to control drive of the tactile sensation providing unit; and
a main controller configured to control an operation of the tactile sensation provision controller based on an output of the touch sensor, wherein
the main controller determines whether an object is touching a predetermined area of the touch face based on the output of the touch sensor, and activates the tactile sensation provision controller from a non-active state when determining that the object is touching the predetermined area, or inactivates the tactile sensation provision controller from an active state when determining that the object is not touching the predetermined area,
the main controller activates the tactile sensation provision controller from a non-active, low-power state when determining that the object is touching the predetermined area, or inactivates the tactile sensation provision controller from an active, high-power state to the non-active, low-power state when determining that the object is not touching the predetermined area, and
in the non-active, low-power state, the tactile sensation provision controller stops controlling detection of a pressing load and drive of a piezoelectric element.

6. A control method for a tactile sensation providing apparatus including
a touch sensor;
a tactile sensation providing unit configured to vibrate a touch face of the touch sensor; and
a tactile sensation provision controller configured to control drive of the tactile sensation providing unit, the control method comprising the steps of:
determining whether an object is touching a predetermined area of the touch face based on an output of the touch sensor, and activating the tactile sensation provision controller from a non-active state when determining that the object is touching the predetermined area, or inactivating the tactile sensation provision controller from an active state when determining that the object is not touching the predetermined area,
activating the tactile sensation provision controller from a non-active, low-power state when determining that the object is touching the predetermined area, or inactivating the tactile sensation provision controller from an active, high-power state to the non-active, low-power state when determining that the object is not touching the predetermined area, wherein
in the non-active, low-power state, the tactile sensation provision controller stops controlling detection of a pressing load and drive of a piezoelectric element.

7. A tactile sensation providing apparatus comprising:
a touch sensor;
a tactile sensation providing unit configured to vibrate a touch face of the touch sensor;
a load detection unit configured to detect a pressing load on the touch sensor;
a tactile sensation provision controller configured to control drive of the tactile sensation providing unit; and
a main controller configured to control an operation of the tactile sensation provision controller based on an output of the touch sensor, wherein
the main controller determines whether an object is touching a predetermined area of the touch face based on the output of the touch sensor, and activates the tactile sensation provision controller from a non-active state when determining that the object is touching the predetermined area, or inactivates the tactile sensation provision controller from an active state when determining that the object is not touching the predetermined area, and
in the active state, the tactile sensation provision controller controls detecting a pressure load by the load detection unit and driving the tactile sensation providing unit based on an output of the load detection unit, and
in the non-active state, the tactile sensation provision controller controls to stop detecting a pressure load by the load detection unit and driving the tactile sensation providing unit based on an output of the load detection unit.

8. A control method for a tactile sensation providing apparatus including
a touch sensor;
a tactile sensation providing unit configured to vibrate a touch face of the touch sensor;
a load detection unit configured to detect a pressing load on the touch sensor; and
a tactile sensation provision controller configured to control drive of the tactile sensation providing unit, the control method comprising the steps of:
determining whether an object is touching a predetermined area of the touch face based on an output of the touch sensor, and activating the tactile sensation provision controller from a non-active state when determining that the object is touching the predetermined area, or inactivating the tactile sensation provision controller from an active state when determining that the object is not touching the predetermined area,
in the active state, controlling, by the tactile sensation provision controller, the detection of a pressure load by the load detection unit and driving the tactile sensation providing unit based on an output of the load detection unit, and in the non-active state, controlling, by the tactile sensation provision controller, to stop detection of a pressure load by the load detection unit and to stop driving the tactile sensation providing unit based on an output of the load detection unit.

* * * * *